US012739258B2

(12) United States Patent
Osipov et al.

(10) Patent No.: US 12,739,258 B2
(45) Date of Patent: Sep. 15, 2026

(54) COMPUTER NETWORK SECURITY

(71) Applicant: Venn Technology Corporation, New York, NY (US)

(72) Inventors: Aleksandr Osipov, Tarrytown, NY (US); Jacob Kazakevich, Manalapan, NJ (US); Zachary Nakaska, Frisco, TX (US)

(73) Assignee: Venn Technology Corporation, New York, NY (US)

( * ) Notice: Subject to any disclaimer, the term of this patent is extended or adjusted under 35 U.S.C. 154(b) by 503 days.

(21) Appl. No.: 17/954,977

(22) Filed: Sep. 28, 2022

(65) Prior Publication Data

US 2023/0101145 A1 Mar. 30, 2023

Related U.S. Application Data

(60) Provisional application No. 63/261,850, filed on Sep. 30, 2021.

(51) Int. Cl.
*H04L 9/40* (2022.01)
*H04L 61/5007* (2022.01)

(52) U.S. Cl.
CPC ...... *H04L 63/1416* (2013.01); *H04L 61/5007* (2022.05); *H04L 63/102* (2013.01); *H04L 63/145* (2013.01); *H04L 63/20* (2013.01)

(58) Field of Classification Search
CPC ............. H04L 63/1425; H04L 63/1408; H04L 63/1416; H04L 63/1441; H04L 63/10; H04L 63/105; H04L 63/108; G06F 21/554; G06F 21/62; G06F 21/6218; G06F 21/6236; G06F 21/6245; G06F 21/629

See application file for complete search history.

(56) References Cited

U.S. PATENT DOCUMENTS

| | | | | |
|---|---|---|---|---|
| 7,748,047 | B2 | 6/2010 | O'Neill | |
| 9,894,099 | B1 * | 2/2018 | Jacobsen | H04L 67/34 |
| 11,075,923 | B1 * | 7/2021 | Srinivasan | H04L 63/108 |
| 11,368,481 | B2 * | 6/2022 | Kirti | H04L 63/1416 |

(Continued)

OTHER PUBLICATIONS

Non-Final Office Action Dated Jul. 20, 2023 for U.S. Appl. No. 17/955,032, filed Sep. 28, 2022.

*Primary Examiner* — Tae K Kim
(74) *Attorney, Agent, or Firm* — Young Basile Hanlon & MacFarlane, P.C.

(57) ABSTRACT

A computer determines, by a security event detector, that an active threat exists at the computer. The security event detector resides at the computer or in a cloud resource. The security event detector identifies active threats at the computer or a network associated with the computer. The computer prevents, in response to determining that the active threat exists, access to a subset of computing resources accessible via the computer. The subset of computing resources is identified via a security policy that applies to the subset of computing resources. The security policy does not apply to one or more computing resources stored at the computer that are not in the subset. The computer determines, subsequent to determining that the active threat exists, that the active threat no longer exists. The computer allows, in response to determining that the active threat no longer exists, access to the subset of computing resources.

20 Claims, 6 Drawing Sheets

(56) References Cited

U.S. PATENT DOCUMENTS 11,757,936 B2* 9/2023 Xiao .................. H04L 63/0227 726/22
11,949,678 B2* 4/2024 Keller ................. H04L 63/1416
2007/0168552 A1 7/2007 Alse et al.
2008/0301273 A1 12/2008 Brown et al.
2009/0037603 A1 2/2009 Battello et al.
2010/0242088 A1* 9/2010 Thomas ................ G06F 21/554 726/4
2015/0188777 A1* 7/2015 Frost ....................... H04L 67/34 709/223
2016/0261564 A1* 9/2016 Foxhoven ............... H04L 63/20
2016/0330236 A1* 11/2016 Reddy ................. H04L 63/1416
2016/0373405 A1 12/2016 Miller et al.
2017/0300690 A1* 10/2017 Ladnai .................. G06F 21/554
2018/0097841 A1* 4/2018 Stolarz ..................... H04K 1/00
2018/0131719 A1* 5/2018 Amit .................. H04L 63/1441
2018/0375894 A1 12/2018 Vervier et al.
2019/0021004 A1* 1/2019 Shanmugavadivel ....................... H04W 12/08
2019/0081963 A1* 3/2019 Waghorn ................ G06F 9/542
2020/0153833 A1* 5/2020 Rosenblum ........... H04W 48/02
2020/0314123 A1* 10/2020 Staab .................... G06F 21/554
2020/0334365 A1* 10/2020 Buck ..................... H04W 4/029
2021/0014256 A1* 1/2021 Malhotra ............ H04L 63/1433
2021/0271741 A1* 9/2021 Habal ................... G06F 21/577
2022/0116397 A1* 4/2022 Deshmukh ............ H04L 63/102
2022/0261487 A1* 8/2022 Lounsberry ......... G06F 21/6209
2022/0272117 A1* 8/2022 Maheve .............. H04L 63/1416
2022/0309156 A1* 9/2022 Grossman ............. G06F 21/554
2022/0311805 A1* 9/2022 Talati ...................... H04L 63/20
2023/0037489 A1* 2/2023 Paul .................... G06F 21/6218
2023/0067858 A1* 3/2023 Shapira ................. G06F 21/554
2023/0085509 A1* 3/2023 Noel ....................... H04L 63/20 726/25
2023/0308460 A1* 9/2023 Thomas ................ H04L 63/102

* cited by examiner

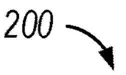
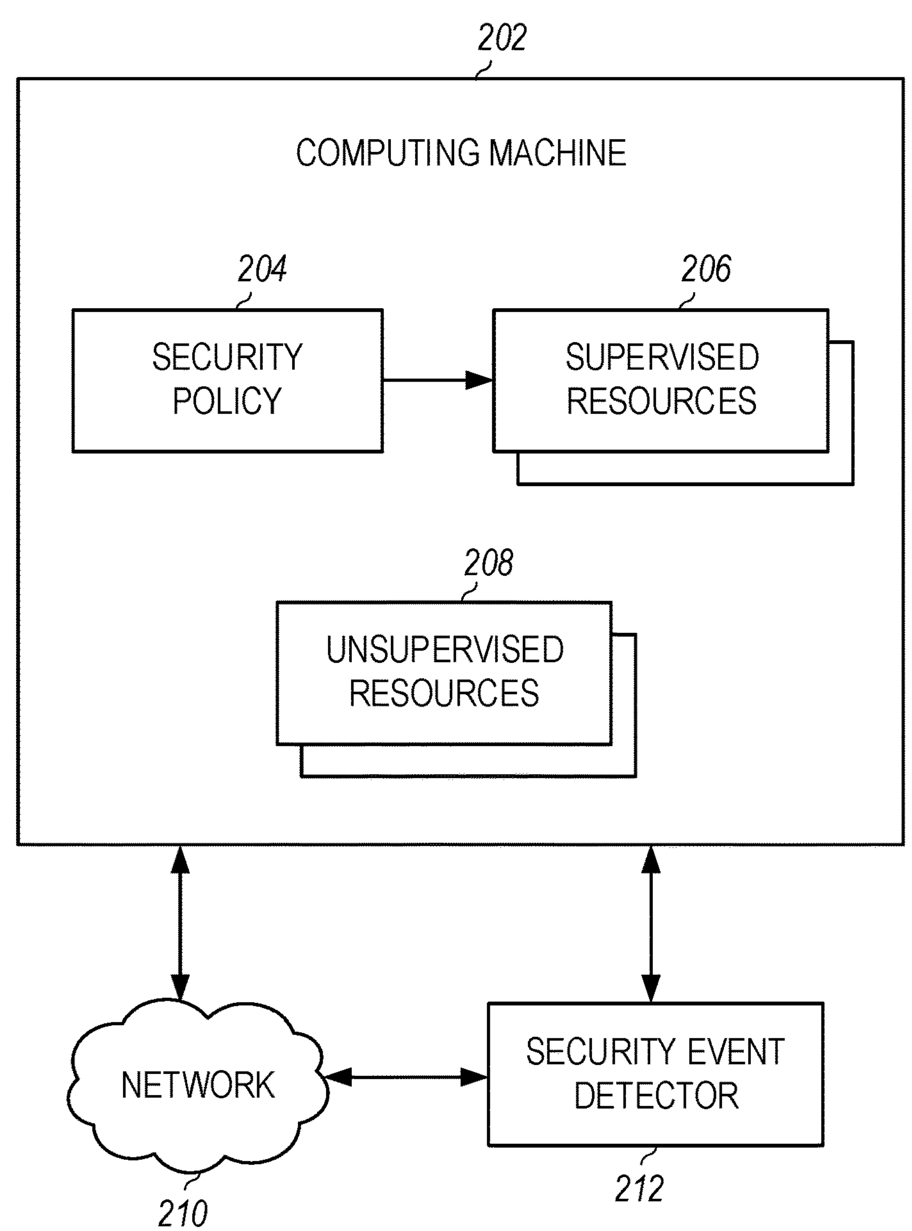
FIG. 2

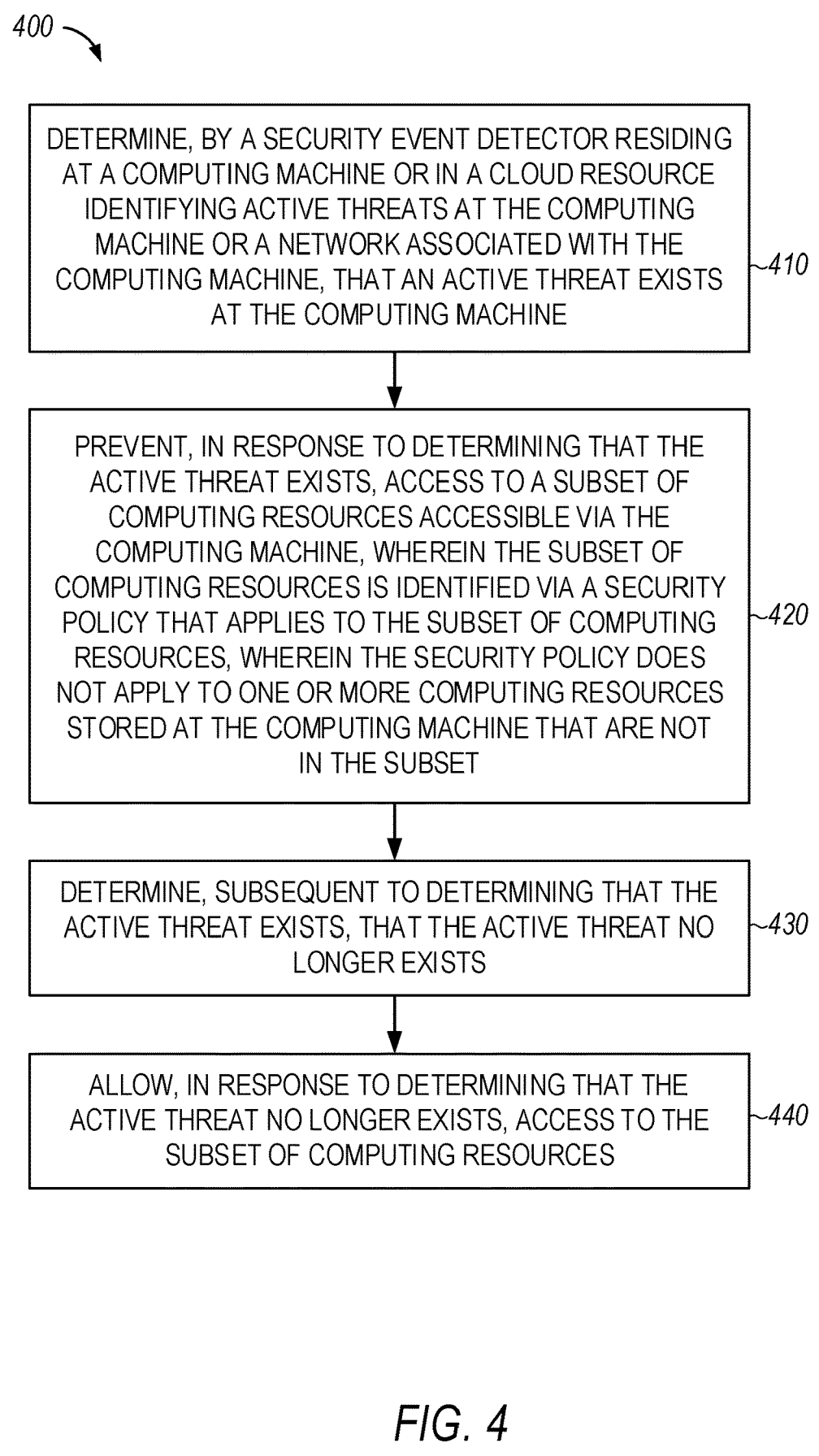

400

DETERMINE, BY A SECURITY EVENT DETECTOR RESIDING AT A COMPUTING MACHINE OR IN A CLOUD RESOURCE IDENTIFYING ACTIVE THREATS AT THE COMPUTING MACHINE OR A NETWORK ASSOCIATED WITH THE COMPUTING MACHINE, THAT AN ACTIVE THREAT EXISTS AT THE COMPUTING MACHINE 410

PREVENT, IN RESPONSE TO DETERMINING THAT THE ACTIVE THREAT EXISTS, ACCESS TO A SUBSET OF COMPUTING RESOURCES ACCESSIBLE VIA THE COMPUTING MACHINE, WHEREIN THE SUBSET OF COMPUTING RESOURCES IS IDENTIFIED VIA A SECURITY POLICY THAT APPLIES TO THE SUBSET OF COMPUTING RESOURCES, WHEREIN THE SECURITY POLICY DOES NOT APPLY TO ONE OR MORE COMPUTING RESOURCES STORED AT THE COMPUTING MACHINE THAT ARE NOT IN THE SUBSET 420

DETERMINE, SUBSEQUENT TO DETERMINING THAT THE ACTIVE THREAT EXISTS, THAT THE ACTIVE THREAT NO LONGER EXISTS 430

ALLOW, IN RESPONSE TO DETERMINING THAT THE ACTIVE THREAT NO LONGER EXISTS, ACCESS TO THE SUBSET OF COMPUTING RESOURCES 440

FIG. 4

| COMPANY A | COMPANY B | COMPANY C |
| --- | --- | --- |
| IP-A1<br>IP-A2<br>IP-A3<br>IP-A4 | IP-B1<br>IP-B2<br>IP-B3<br>IP-B4 | IP-C1<br>IP-C2<br>IP-C3<br>IP-C4 |
| EMAIL APP<br>SALES APP | EMAIL APP<br>CLOUD STORAGE APP | CLOUD STORAGE APP<br>SAAS APP |

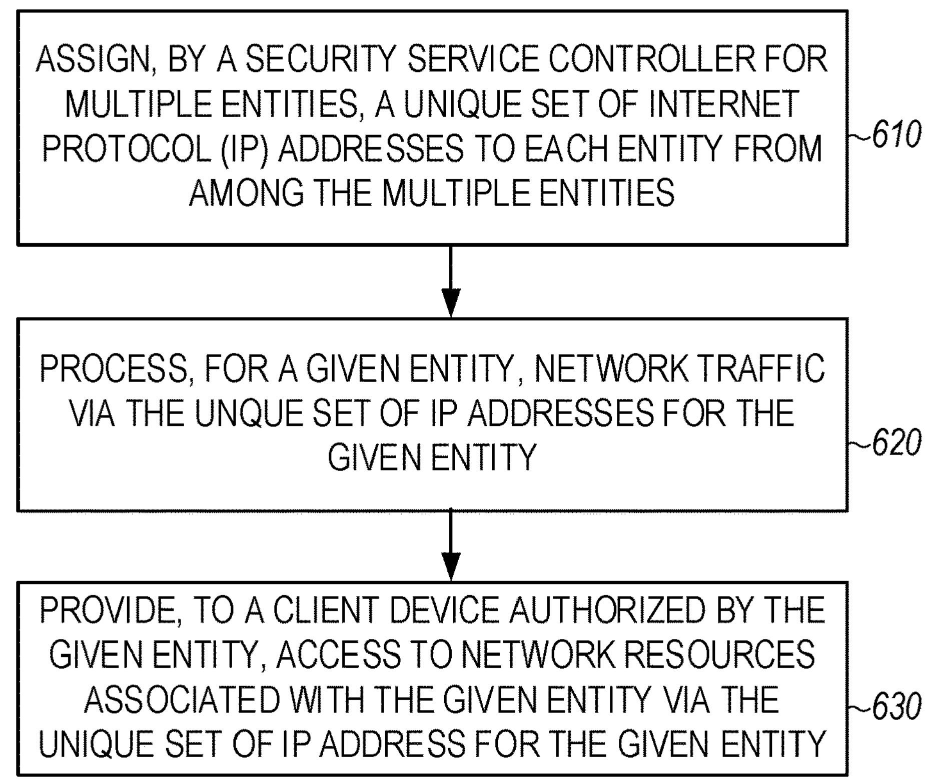
FIG. 6

COMPUTER NETWORK SECURITY

PRIORITY CLAIM

This application claims priority to U.S. Provisional Patent Application No. 63/261,850, titled "COMPUTER NETWORK SECURITY," filed on Sep. 30, 2021, the entire disclosure of which is incorporated herein by reference.

TECHNICAL FIELD

Embodiments pertain to computer architecture. Some embodiments relate to computer network security. Some embodiments relate to protecting a subset of computing resources from an active threat. Some embodiments relate to securing Internet applications using a dedicated Internet Protocol (IP) space.

BACKGROUND

Many computers are connected to the Internet. Some of these computers may store, transmit or receive sensitive data. Techniques for computer and Internet security may be desirable.

BRIEF DESCRIPTION OF THE DRAWINGS

FIG. 2 is a block diagram of an example system in which protecting a subset of computing resources from an active threat may be implemented, in accordance with some embodiments.

FIG. 4 is a flowchart of an example process associated with protecting a subset of resources at a computing machine from an active threat, in accordance with some embodiments.

FIG. 6 is a flowchart of an example process associated with securing Internet applications using a dedicated Internet Protocol space, in accordance with some embodiments.

DETAILED DESCRIPTION

Figure 1:
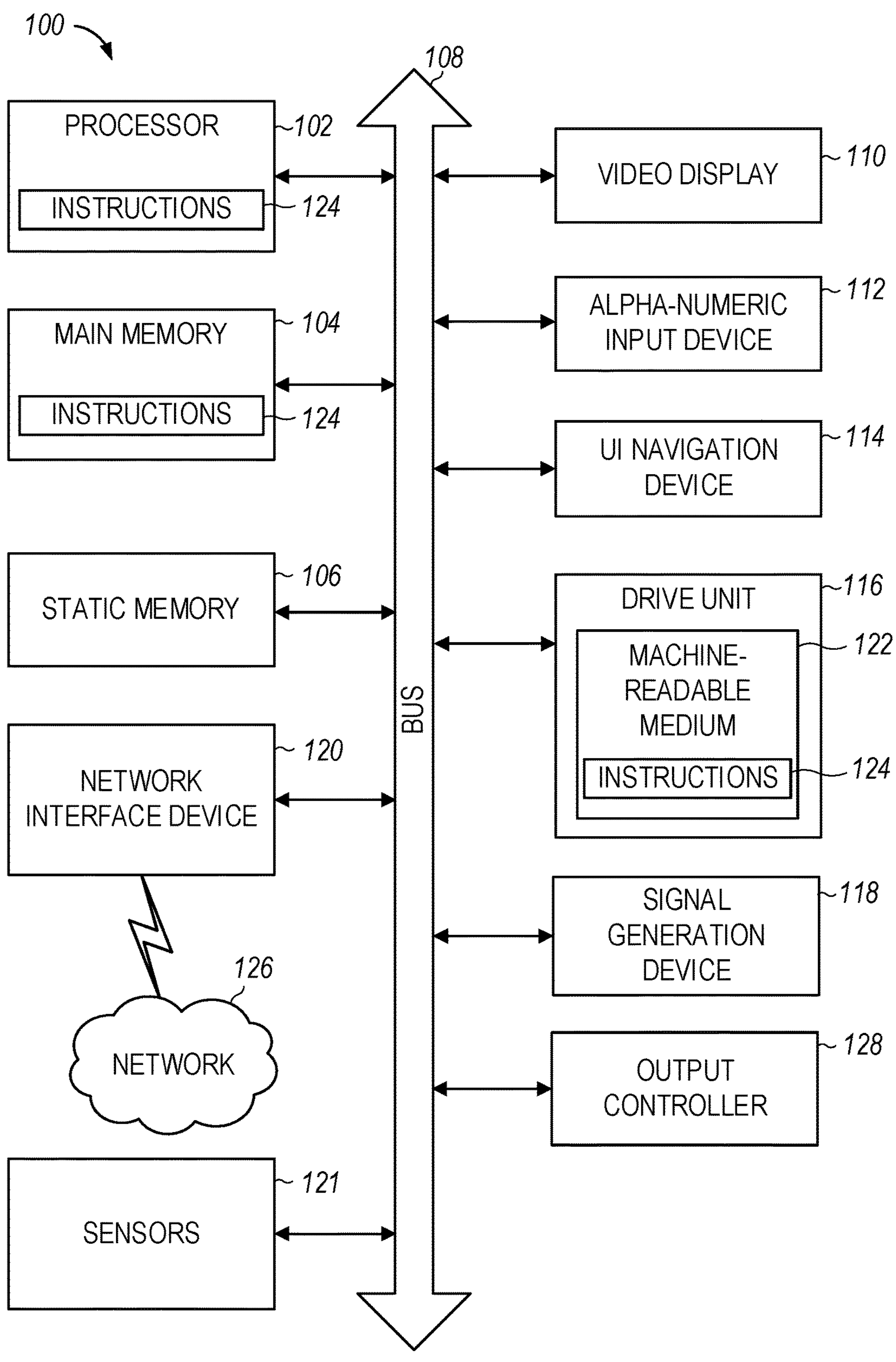
FIG. 1 is a block diagram of a computing machine, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Aspects of the present technology may be implemented as part of a computer system. The computer system may be one physical machine, or may be distributed among multiple physical machines, such as by role or function, or by process thread in the case of a cloud computing distributed model. In various embodiments, aspects of the technology may be configured to run in virtual machines that in turn are executed on one or more physical machines. It will be understood by persons of skill in the art that features of the technology may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software, the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "model" encompasses its plain and ordinary meaning. A model may include, among other things, one or more engines which receive an input and compute an output based on the input. The output may be a classification. For example, an image file may be classified as depicting a cat or not depicting a cat. Alternatively, the image file may be assigned a numeric score indicating a likelihood whether the image file depicts the cat, and image files with a score exceeding a threshold (e.g., 0.9 or 0.95) may be determined to depict the cat.

This document may reference a specific number of things (e.g., "six mobile devices"). Unless explicitly set forth otherwise, the numbers provided are examples only and may be replaced with any positive integer, integer or real number, as would make sense for a given situation. For example, "six mobile devices" may, in alternative embodiments, include any positive integer number of mobile devices. Unless otherwise mentioned, an object referred to in singular form (e.g., "a computer" or "the computer") may include one or multiple objects (e.g., "the computer" may refer to one or multiple computers).

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display 110 (or other display unit), an alphanumeric input device 112 (e.g., a keyboard), and a user interface (UI) navigation device 114 (e.g., a mouse). In an example, the video display unit 110, input device 112 and UI navigation device 114 may be a touch screen display. The computing machine 100 may additionally include a storage device (e.g., drive unit 116), a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the drive unit 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, Internet Protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

FIG. 2 is a block diagram of an example system 200 in which protecting a subset of computing resources from an active threat may be implemented, in accordance with some embodiments.

As shown, the system 200 includes a computing machine 202. The computing machine 202 may include all or a portion of the components of the computing machine 100 shown in FIG. 1. As shown, the computing machine 202 stores a security policy 204, supervised resources 206, and unsupervised resources 208. The security policy 204 stores and enforces security rules which limit accessing, sharing, modifying, and transmitting of supervised resources 206. The security rules in the security policy 204 do not apply to unsupervised resources 208.

In some embodiments, the security policy 204 is associated with a business. The supervised resources 206 are business resources, and the unsupervised resources 208 are personal resources stored at the computing machine 202. The resources may include files, email messages, applications, network ports, network destinations, website access permissions, and external filesystem access permissions.

As used herein, the phrase "security policy" encompasses its plain and ordinary meaning. A security policy defines authorized and unauthorized actions with respect to a set of computing resources (e.g., business computing resources or each and every computing resource at the computing machine), and prevents a computing machine (e.g., the computing machine 202) from taking unauthorized actions. A security policy may include various access permissions (e.g., by antivirus or other software) and computing resource sharing permissions. The security policy may require that certain actions (e.g., entering a password, verifying user identity by fingerprint or facial scan, and the like) be taken before accessing a computing resource covered by the security policy or before sharing (e.g., via a messaging service) the computing resource covered by the security policy.

In some cases, the security policy may include a tracking policy or a monitoring policy. For example, the tracking policy or the monitoring policy may allow a supervisor (e.g., at a remote computing machine) to monitor activity of the user of the computing machine (e.g., the computing machine 202) with respect to the computing resources covered by the tracking policy or the monitoring policy. The tracking policy or the monitoring policy may store records of the activity of the user of the computing machine with respect to the computing resources at a server or a data repository that is accessible to the supervisor. The tracking policy or the monitoring policy may apply to resources within the supervised zone, and not to computing resources outside the supervised zone.

As shown, the computing machine 202 is connected to a network 210. The network 210 may include the Internet, an intranet, a local area network, a wide area network, a Wi-Fi® network, a cellular network, and the like. The system 200 also includes a security event detector 212. The security event detector 212 may be implemented in software and/or hardware and may reside on the computing machine 202, on another machine or on the network 210. The security event detector 212 may include one or more of an antivirus program, an antimalware program, a network threat detector and the like. The security event detector 212 detects active threat(s) (or the absence of active threat(s)) at the computing machine 202 or on the network 210. As shown, the security event detector 212 is directly connected with the network 210 and the computing machine 202. In alternative embodiments, the security event detector 212 may reside on the computing machine 202 or may reside on the network 210. The security event detector 212 might not be connected to the network 210 and/or the computing machine 202. In some implementations, the security event detector 212 resides at the computing machine 202 or in a cloud resource. The cloud resources identifies active threats at the computing machine 202 or the network 210 associated with the computing machine 202.

As used herein, the phrase "active threat" may include, among other things, any security threat. An active threat may include one or more of: a computer virus, unusual (e.g., different from a baseline) network activity, unusual remote access to the computing machine 202, and the like. An active threat may include data-related risks (insider threats, e.g., user pulling data out of machine or other behavior) or security threat-related feeds (threat feeds that flag indicators that network traffic, file(s), application(s), memory, domain (s) or user behavior are a security threat). An active threat may include an external machine (or local malware) making unauthorized changes or receiving unauthorized access to a computer, such as the computing machine 202. The changes may be unauthorized by an administrator or by a user of the computer.

Figure 3:
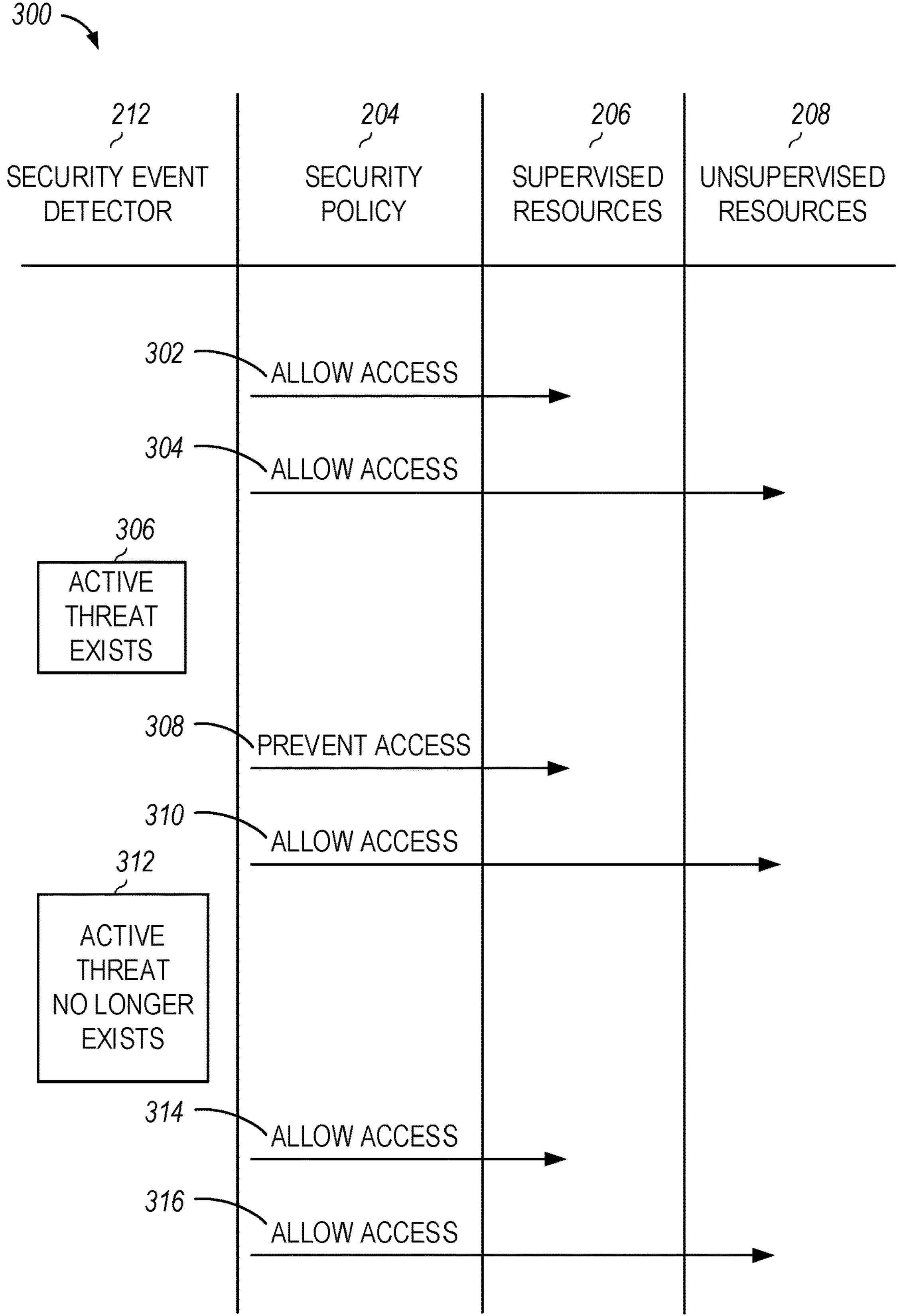
FIG. 3 is a data flow diagram of an example process for protecting a subset of computing resources from an active threat, in accordance with some embodiments.

An example of the interoperation of the security event detector 212, the security policy 204, the supervised resources 206, and the unsupervised resources 208 is described in conjunction with FIG. 3. FIG. 3 is a data flow diagram of an example process 300 for protecting a subset of computing resources from an active threat, in accordance with some embodiments.

The process 300 begins at operation 302 when, in usual operation of the computing machine 202, the security policy 204 allows access (e.g., to a user of the computing machine 202) to the supervised resources 206. At block 304, the security policy 204 allows access to the unsupervised resources 208.

At block 306, the security event detector 212 determines that an active threat exists. The security event detector 212 may notify the computing machine 202 that the active threat exists. The security event detector 212 may scan the computing machine 202 and/or the network 210 for threats once every threshold time period (e.g., once per minute) and may determine, during this scanning, that there is an active threat. The security event detector 212 may scan the computing machine 202 upon detection of occurrence of a specified event. The specified event may be, for example, a download to the computing machine 202, an installation of an application at the computing machine 202, or a modification of software at the computing machine. The specified event may be any event detectable by the security event detector 212 or the computing machine 202, such as a mouse click, a touch of a touchscreen, a keyboard press, n mouse clicks, n touches of the touch screen, n keyboard presses, or a combination of n of the above events, where n is a positive integer. For example, the specified event may occur every time a total number of mouse clicks, touchscreen touches, and keyboard presses exceeds m, where m is a positive integer. In some implementations, determining that the active threat exists includes scanning, using the security event detector 212, the computing machine 202 and/or the network 210 to identify the active threat.

At block 308, in response to determining that the active threat exist, the security event detector 212 (e.g., based on rules stored in the security policy 204, and/or externally to the computing machine 202) prevents (e.g., blocks) access to the supervised resources 206. For example, the security event detector 212 transmits, to the computing machine 202, an instruction to block access to the supervised resources 206. A user of the computing machine 202 may be notified, for example by an email message, a push notification, or another notification supported by the operating system of the computing machine 202, that access to the supervised resources 206 is blocked until the active threat no longer exists. At block 310, the security policy 204 continues to allow access to the unsupervised resources 208. In preventing access to the supervised resources 206, the security policy 204 may make one or more files from the supervised resources 206 inaccessible at the computing machine 202. In preventing access to the supervised resources 206, the security policy 204 may make a running application inaccessible at the computing machine 202. The running application is one of the supervised resources 206 and/or accesses computing resources from among the supervised resources 206.

At block 312, the security event detector 212 determines that an active threat no longer exists. The security event detector 212 may notify the computing machine 202 that the active threat no longer exists. Alternatively, no notification is transmitted to the computing machine 202. The security event detector 212 may scan the computing machine 202 and/or the network 210 for threats once every threshold time period (e.g., once per minute) or upon detection of occurrence of a specified event (e.g., application installation at the computing machine 202), and may determine, during this scanning, that there is the active threat no longer exists. In some embodiments, the security event detector 212 persistently checks, once every threshold time period, (e.g., 50 seconds or 60 seconds) whether the active threat still exists at the computing machine 202 and/or the network 210. The threshold time period may be between thirty and ninety seconds.

After determining that the active threat no longer exists, at block 314, the security policy 204 allows (e.g., unblocks) access to the supervised resources 206. The security event detector 212 transmits, to the computing machine 202, a notification indicating that access to the supervised resources 206 is permitted. At block 316, the security policy 204 allows access to the unsupervised resources 208. After block 316, the process 300 ends.

FIG. 4 is a flowchart of an example process 400 associated with protecting a subset of resources at a computing machine from an active threat. In some implementations, one or more process blocks of FIG. 4 may be performed by a computing machine (e.g., computing machine 100). In some implementations, one or more process blocks of FIG. 4 may be performed by another device or a group of devices separate from or including the computing machine. Additionally, or alternatively, one or more process blocks of FIG. 4 may be performed by one or more components of the computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 4, process 400 may include, at the computing machine, determining, by a security event detector, that an active threat exists at the computing machine, wherein the security event detector resides at the computing machine or in a cloud resource, wherein the security event detector identifies active threats at the computing machine or a network associated with the computing machine (block 410).

As further shown in FIG. 4, process 400 may include, at the computing machine, preventing, in response to determining that the active threat exists, access to a subset of computing resources accessible via the computing machine, wherein the subset of computing resources is identified via a security policy that applies to the subset of computing resources, wherein the security policy does not apply to one or more computing resources stored at the computing machine that are not in the subset (block 420).

As further shown in FIG. 4, process 400 may include, at the computing machine, determining, subsequent to determining that the active threat exists, that the active threat no longer exists (block 430).

As further shown in FIG. 4, process 400 may include, at the computing machine, allowing, in response to determining that the active threat no longer exists, access to the subset of computing resources (block 440).

Process 400 may include additional implementations, such as any single implementation or any combination of implementations described below and/or in connection with one or more other processes described elsewhere herein.

In a first implementation, the computing machine stores personal computing resources and business computing resources, wherein the subset of computing resources comprises the business computing resources and not the personal computing resources, wherein the computing resources comprise files, email messages, applications, network ports, network destinations, website access permissions, and external filesystem access permissions.

In a second implementation, determining that the active threat exists comprises scanning, using the security event detector, the computing machine or the associated network to identify the active threat.

In a third implementation, determining that the active threat no longer exists comprises persistently checking using the security event detector, once every threshold time period or upon detection of occurrence of a specified event, whether the active threat still exists at the computing machine or the associated network.

In a fourth implementation, the threshold time period is between thirty and ninety seconds.

In a fifth implementation, preventing access to the subset comprises making a running application inaccessible at the computing machine, wherein the running application is in the subset or accesses a computing resource from the subset.

In a sixth implementation, preventing access to the subset comprises making one or more files in the subset inaccessible at the computing machine.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
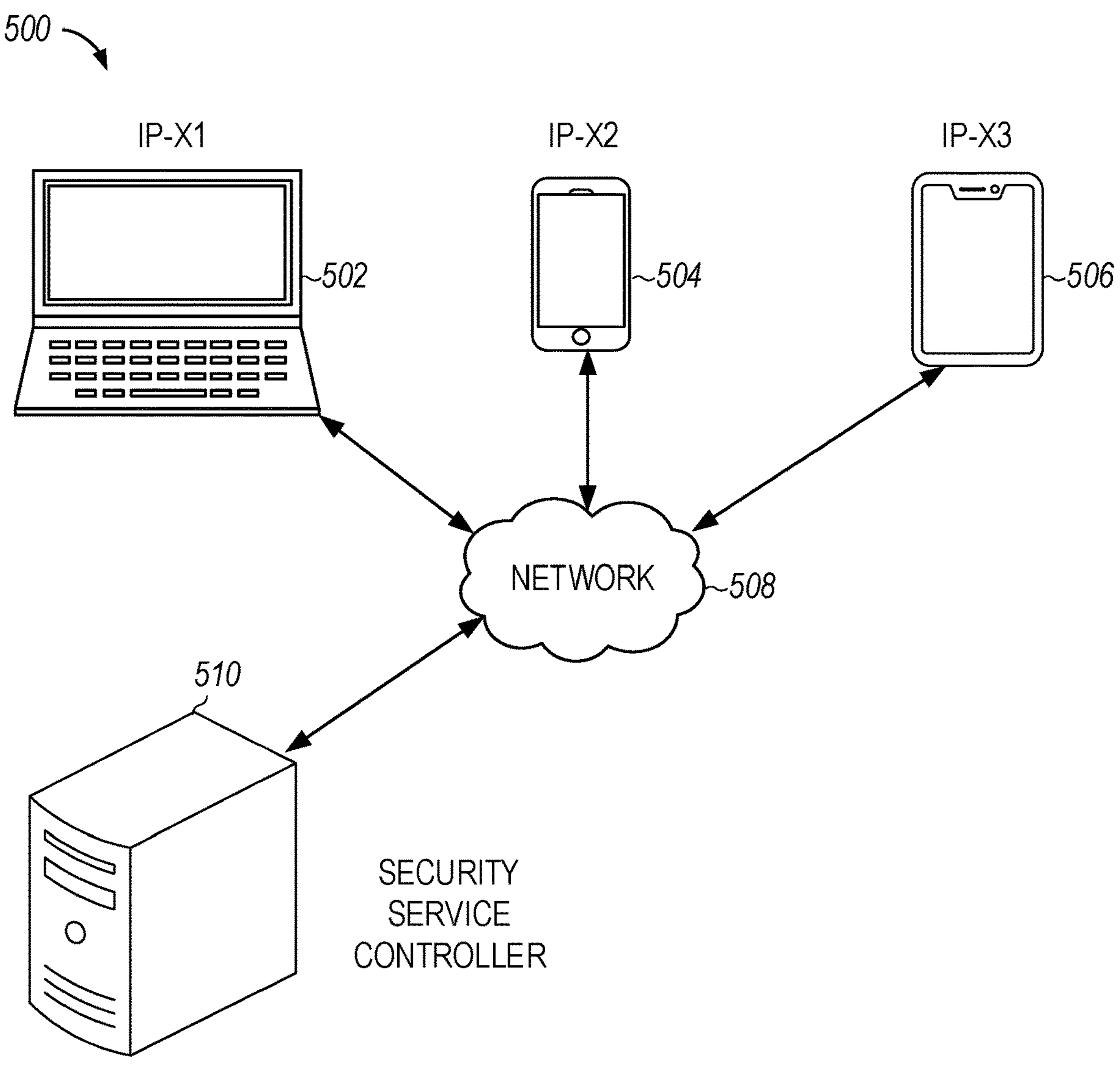
FIG. 5 is a diagram of an example system in which securing Internet applications using a dedicated Internet Protocol space may be implemented, in accordance with some embodiments.

FIG. 5 is a diagram of an example system 500 in which securing Internet applications using a dedicated Internet Protocol space may be implemented, in accordance with some embodiments.

As shown in FIG. 5, client devices 502, 504, and 506 are connected to a network 508 (e.g., the Internet). Each client device 502, 504, and 506 may be one of: a laptop computer, a desktop computer, a mobile phone, a tablet computer, a digital music player, a personal digital assistant, a smartwatch, and the like. A security service controller 510 is also connected to the network 508. The security service controller 510 may be implemented as a server, a cluster of servers, or a service coupled with a data repository (e.g., a database). As shown, the client device 502 is associated with Internet Protocol (IP) address IP-X1. The client device 504 is associated with IP address IP-X2. The client device 506 is associated with IP address IP-X3. The security service controller 510 may include one or more servers.

As shown, the security service controller 510 has multiple IP addresses: IP-A1, IP-A2, IP-A3, IP-A4, IP-B1, IP-B2, IP-B3, IP-B4, IP-C1, IP-C2, IP-C3, and IP-C4. Each user-entity (Company A, Company B, and Company C) of the security service controller 510 is assigned a subset of those IP addresses for its own use. As shown, Company A is assigned IP-A1, IP-A2, IP-A3, and IP-A4. Company B is assigned IP-B1, IP-B2, IP-B3, and IP-B4. Company C is assigned IP-C1, IP-C2, IP-C3, and IP-C4. As used herein, a "user-entity" may be a customer, a client or any other user-entity. A user-entity of the security service controller 510 may or may not have a financial relationship with a business providing the security service controller 510. A company may be an organization (e.g., ABC Corporation) or a part of the organization (e.g., the legal team of ABC Corporation). In one example, Company A corresponds to the legal team of ABC Corporation and Company B corresponds to the engineering team of ABC Corporation. As a result, the legal team and the engineering team may access different resources at different IP addresses from one another.

Each user-entity may specify application(s) of the user-entity which may be accessed via its assigned IP addresses and, in some cases, not via other server(s). As shown, Company A specifies that its email application (app) and sales app may be accessed via its assigned IP addresses and, in some cases, not via other server(s). Company B specifies that its email app and cloud storage app may be accessed via its assigned IP addresses and, in some cases, not via other server(s). Company C specifies that its cloud storage app and software as a service (SaaS) app may be accessed via its assigned IP addresses and, in some cases, not via other server(s).

In some embodiments, the security service controller 510 assigns a unique set of IP addresses to each user-entity from among multiple user-entities. For example, the user-entity Company A is assigned the IP addresses IP-A1, IP-A2, IP-A3, and IP-A4. The security service controller 510 processes, for a given user-entity, network traffic via the unique set of IP addresses for the given entity. For example, for Company A, network traffic is processed via the IP addresses IP-A1, IP-A2, IP-A3, and IP-A4. The security service controller 510 provides, to a client device (e.g., client device 502) authorized by the given entity, access to network resources (e.g., email app, sales app or other resources stored or accessed via the network 508) associated with the given entity (e.g., Company A) via the unique set of IP addresses (IP-A1, IP-A2, IP-A3, and IP-A4) for the given entity.

In some embodiments, the unique set of IP addresses for the given entity comprises IP addresses associated with geographic regions. Each IP address processes network traffic from the associated geographic region. For example, for Company A, IP-A1 may be associated with the northeastern United States of America (USA), IP-A2 may be associated with the southeastern USA, IP-A3 may be associated with the northwestern USA, and IP-A4 may be associated with the southwestern USA. If a user accesses Company A's resources from the northeastern USA, his/her traffic would be processed via IP-A1. If the user travels to the southeastern USA, his/her traffic would be processed via IP-A2 during his/her trip.

In some embodiments, the security service controller 510 allows access to the unique set of IP addresses for the given entity from a predefined group of remote IP addresses specified by the given entity and/or associated with a user associated with the given entity and not from other IP addresses outside the predefined group of remote IP addresses. A client device (e.g., client device 502) accessing the data for the given entity is associated with an IP address from the predefined group. For example, Company A may specify that IP addresses IP-X1 and IP-X2, but not IP-X3 are allowed to access Company A's data (e.g., the IP addresses IP-A1, IP-A2, IP-A3, and IP-A4 and the email application and sales application of Company A), thereby allowing client devices 502 and 504, but not client device 506, to access Company A's data.

In some embodiments, the security service controller 510 allows access to a predefined set of applications specified by the given entity from the unique set of IP addresses for the given entity and not from other IP addresses. The client device is running an application from the predefined set of applications. For example, Company A may specify that its email app and sales app may be accessed via Company A's assigned IP addresses: IP-A1, IP-A2, IP-A3, and IP-A4. In this case, the email app and the sales app of Company A would not be accessible from other mail server(s), application server(s) or web server(s).

In some embodiments, the security service controller 510 determines that an amount of network traffic associated with the given entity exceeds a threshold. The security service controller 510 assigns one or more additional gateways to the unique set of IP addresses for the given entity. In some embodiments, the network traffic processed for the given entity is isolated to the unique set of IP addresses for the given entity. The network traffic may be associated with one or more predefined applications accessed via the network. A gateway may include a computing machine that transmits data between different networks or applications. The gateway converts (or forwards without converting) data from one protocol or format to another. In some cases, a router may perform some of the functions of a gateway. In some cases, a gateway may act as a protocol converter that converts data from one protocol (e.g., a local network communication protocol) to another protocol (e.g., an Internet communication protocol).

FIG. 6 is a flowchart of an example process 600 associated with securing Internet applications using a dedicated Internet Protocol space. In some implementations, one or more process blocks of FIG. 6 may be performed by a security service controller (e.g., security service controller 510 or computing machine 100). In some implementations, one or more process blocks of FIG. 6 may be performed by another device or a group of devices separate from or including the security service controller. Additionally, or alternatively, one or more process blocks of FIG. 6 may be performed by one or more components of the computing machine 100, such as processor 102, main memory 104, static memory 106, network interface device 120, video display 110, alpha-numeric input device 112, UI navigation device 112, drive unit 116, signal generation device 118, and output controller 128.

As shown in FIG. 6, process 600 may include assigning a unique set of Internet Protocol (IP) addresses to each entity from among the multiple entities (block 610). For example, the security service controller may assign a unique set of Internet Protocol (IP) addresses to each entity from among the multiple entities, as described above. The security service controller may be a security service controller for multiple entities (e.g., Company A, Company B, and Company C, as shown in FIG. 5).

As further shown in FIG. 6, process 600 may include processing, for a given entity, network traffic via the unique set of IP addresses for the given entity (block 620). For example, the security service controller may processing, for a given entity, network traffic via the unique set of IP addresses for the given entity, as described above.

As further shown in FIG. 6, process 600 may include providing, to a client device authorized by the given entity, access to network resources associated with the given entity via the unique set of IP addresses for the given entity (block 630). For example, the security service controller may provide, to a client device authorized by the given entity, access to network resources associated with the given entity via the unique set of IP addresses for the given entity, as described above.

Process 600 may include additional implementations, such as any single implementation or any combination of implementations described below and/or in connection with one or more other processes described elsewhere herein.

In a first implementation, the unique set of IP addresses for the given entity comprises IP addresses associated with geographic regions, each IP address processing network traffic from the associated geographic region.

In a second implementation, process 600 includes allowing access to the unique set of IP addresses for the given entity only from a predefined group of remote IP addresses specified by the given entity and/or associated with a user associated with the given entity, wherein the client device is associated with an IP address from the predefined group. Computing machines outside the predefined group of remote IP addresses may lack access to the unique set of IP addresses or may be blocked (e.g., by the security service controller 510) from accessing the unique set of IP addresses.

In a third implementation, process 600 includes allowing access to a predefined set of applications specified by the given entity through the unique set of IP addresses for the given entity, wherein the client device is running an application from the predefined set of applications.

In a fourth implementation, process 600 includes determining that an amount of network traffic associated with the given entity exceeds a threshold, and assigning, by the security service controller, one or more additional gateways to the unique set of IP addresses for the given entity.

In a fifth implementation, the network traffic processed for the given entity is isolated to the unique set of IP addresses for the given entity.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some embodiments are described as numbered examples (Example 1, 2, 3, etc.). These are provided as examples only and do not limit the technology disclosed herein.

Example 1 is a method comprising: determining, by a security event detector, that an active threat exists at a computing machine, wherein the security event detector resides at the computing machine or in a cloud resource, wherein the security event detector identifies active threats at the computing machine or a network associated with the computing machine; preventing, in response to determining that the active threat exists, access to a subset of computing resources accessible via the computing machine, wherein the subset of computing resources is identified via a security policy that applies to the subset of computing resources, wherein the security policy does not apply to one or more computing resources stored at the computing machine that are not in the subset; determining, subsequent to determining that the active threat exists, that the active threat no longer exists; and allowing, in response to determining that the active threat no longer exists, access to the subset of computing resources.

In Example 2, the subject matter of Example 1 includes, wherein the computing machine stores personal computing resources and business computing resources, wherein the subset of computing resources comprises the business computing resources and not the personal computing resources, wherein the computing resources comprise files, email messages, applications, network ports, network destinations, website access permissions, and external filesystem access permissions.

In Example 3, the subject matter of Examples 1-2 includes, wherein determining that the active threat exists comprises: scanning, using the security event detector, the computing machine or the associated network to identify the active threat.

In Example 4, the subject matter of Examples 1-3 includes, wherein determining that the active threat no longer exists comprises: persistently checking using the security event detector, once every threshold time period, whether the active threat still exists at the computing machine or the associated network.

In Example 5, the subject matter of Example 4 includes, wherein the threshold time period is between thirty and ninety seconds.

In Example 6, the subject matter of Examples 1-5 includes, wherein preventing access to the subset comprises: making a running application inaccessible at the computing machine, wherein the running application is in the subset or accesses a computing resource from the subset.

In Example 7, the subject matter of Examples 1-6 includes, wherein preventing access to the subset comprises: making one or more files in the subset inaccessible at the computing machine.

Example 8 is a method comprising: assigning, by a security service controller for multiple entities, a unique set of Internet Protocol (IP) addresses to each entity from among the multiple entities; processing, for a given entity, network traffic via the unique set of IP addresses for the given entity; and providing, to a client device authorized by the given entity, access to network resources associated with the given entity via the unique set of IP addresses for the given entity.

In Example 9, the subject matter of Example 8 includes, wherein the unique set of IP addresses for the given entity comprises IP addresses associated with geographic regions, each IP address processing network traffic from the associated geographic region.

In Example 10, the subject matter of Examples 8-9 includes, allowing access to the unique set of IP addresses for the given entity only from a predefined group of remote IP addresses specified by the given entity and/or associated with a user associated with the given entity, wherein the client device is associated with an IP address from the predefined group.

In Example 11, the subject matter of Examples 8-10 includes, allowing access to a predefined set of applications specified by the given entity only from the unique set of IP addresses for the given entity, wherein the client device is running an application from the predefined set of applications.

In Example 12, the subject matter of Examples 8-11 includes, determining that an amount of network traffic associated with the given entity exceeds a threshold; and assigning, by the security service controller, one or more additional gateways to the unique set of IP addresses for the given entity.

In Example 13, the subject matter of Examples 8-12 includes, wherein the network traffic, associated with one or more predefined applications accessed via the network, processed for the given entity is isolated to the unique set of IP addresses for the given entity.

Example 14 is at least one machine-readable medium including instructions that, when executed by processing circuitry, cause the processing circuitry to perform operations to implement of any of Examples 1-13.

Example 15 is an apparatus comprising means to implement of any of Examples 1-13.

Example 16 is a system to implement of any of Examples 1-13.

Example 17 is a method to implement of any of Examples 1-13.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

determining, by a security event detector that operates based on a security policy, that an active threat exists at a computing machine, the security policy comprising a tracking policy that monitors activity with respect to a subset of computing resources accessible via the computing machine while not monitoring activity with respect to one or more computing resources stored at the computing machine that are not in the subset, wherein the security event detector resides at the computing machine or in a cloud resource, wherein the security event detector identifies active threats at the computing machine or a network associated with the computing machine, wherein the tracking policy causes storage, at a data repository, of records of the activity with respect to the subset and does not cause storage, at the data repository, of records of the activity with respect to the one or more computing resources that are not in the subset;

preventing, in response to determining that the active threat exists, access to the subset of the computing resources, wherein the preventing comprises continuing to allow access to the one or more computing resources that are not in the subset while access to the subset is prevented, wherein the subset is determined by the security policy prior to the determining that the active threat exists, wherein preventing access to the subset comprises making inaccessible, at the computing machine, at least one running application that accesses the subset, wherein the computing machine continues to allow access to the one or more computing resources that are not in the subset, wherein the security policy is enforced with respect to the subset of computing resources and is not enforced with respect to the one or more computing resources that are not in the subset;

determining, subsequent to determining that the active threat exists, that the active threat no longer exists; and allowing, in response to determining that the active threat no longer exists, access to the subset of computing resources.

2. The method of claim 1, wherein the computing machine stores personal computing resources and business computing resources, wherein the subset of computing resources comprises the business computing resources and not the personal computing resources, wherein the computing resources comprise files, email messages, applications, network ports, network destinations, website access permissions, and external filesystem access permissions.

3. The method of claim 1, wherein determining that the active threat exists comprises:

scanning the computing machine to detect remote access to the computing machine.

4. The method of claim 1, wherein determining that the active threat no longer exists comprises:

persistently checking using the security event detector, once every threshold time period or upon detection of occurrence of a specified event, whether the active threat still exists at the computing machine or the associated network.

5. The method of claim 4, wherein the persistently checking occurs once every threshold time period, wherein the threshold time period is between thirty and ninety seconds.

6. The method of claim 1, wherein preventing access to the subset comprises:

making a running application inaccessible at the computing machine, wherein the running application is in the subset or accesses a computing resource from the subset.

7. The method of claim 1, wherein preventing access to the subset comprises: making one or more files in the subset inaccessible at the computing machine.

8. A non-transitory machine-readable medium storing instructions that, when executed by processing circuitry, cause the processing circuitry to perform operations comprising:

determining, by a security event detector that operates based on a security policy, that an active threat exists at a computing machine, the security policy comprising a tracking policy that monitors activity with respect to a subset of computing resources accessible via the computing machine while not monitoring activity with respect to one or more computing resources stored at the computing machine that are not in the subset, wherein the security event detector resides at the computing machine or in a cloud resource, wherein the security event detector identifies active threats at the computing machine or a network associated with the computing machine, wherein the tracking policy causes storage, at a data repository, of records of the activity with respect to the subset and does not cause storage, at the data repository, of records of the activity with respect to the one or more computing resources that are not in the subset;

preventing, in response to determining that the active threat exists, access to the subset of the computing resources, wherein the preventing comprises continuing to allow access to the one or more computing resources that are not in the subset while access to the subset is prevented, wherein the subset is determined by the security policy prior to the determining that the active threat exists, wherein preventing access to the subset comprises making inaccessible, at the computing machine, at least one running application that accesses the subset, wherein the computing machine continues to allow access to the one or more computing resources that are not in the subset, wherein the security policy is enforced with respect to the subset of computing resources and is not enforced with respect to the one or more computing resources that are not in the subset;

determining, subsequent to determining that the active threat exists, that the active threat no longer exists; and allowing, in response to determining that the active threat no longer exists, access to the subset of computing resources.

9. The machine-readable medium of claim 8, wherein the computing machine stores personal computing resources and business computing resources, wherein the subset of computing resources comprises the business computing resources and not the personal computing resources, wherein the computing resources comprise files, email messages, applications, network ports, network destinations, website access permissions, and external filesystem access permissions.

10. The machine-readable medium of claim 8, wherein determining that the active threat exists comprises:

scanning, using the security event detector, the computing machine or the associated network to identify the active threat.

11. The machine-readable medium of claim 8, wherein determining that the active threat no longer exists comprises:

persistently checking using the security event detector, once every threshold time period or upon detection of occurrence of a specified event, whether the active threat still exists at the computing machine or the associated network.

12. The machine-readable medium of claim 11, wherein the persistently checking occurs once every threshold time period, wherein the threshold time period is between thirty and ninety seconds.

13. The machine-readable medium of claim 8, wherein preventing access to the subset comprises:

making a running application inaccessible at the computing machine, wherein the running application is in the subset or accesses a computing resource from the subset.

14. The machine-readable medium of claim 8, wherein preventing access to the subset comprises:

making one or more files in the subset inaccessible at the computing machine.

15. A system comprising:

processing circuitry; and a memory storing instructions that, when executed by processing circuitry, cause the processing circuitry to perform operations comprising:

determining, by a security event detector that operates based on a security policy, that an active threat exists at a computing machine, the security policy comprising a tracking policy that monitors activity with respect to a subset of computing resources accessible via the computing machine while not monitoring activity with respect to one or more computing resources stored at the computing machine that are not in the subset, wherein the security event detector resides at the computing machine or in a cloud resource, wherein the security event detector identifies active threats at the computing machine or a network associated with the computing machine, wherein the tracking policy causes storage, at a data repository, of records of the activity with respect to the subset and does not cause storage, at the data repository, of records of the activity with respect to the one or more computing resources that are not in the subset;

preventing, in response to determining that the active threat exists, access to the subset of the computing resources, wherein the preventing comprises continuing to allow access to the one or more computing resources that are not in the subset while access to the subset is prevented, wherein the subset is determined by the security policy prior to the determining that the active threat exists, wherein preventing access to the subset comprises making inaccessible, at the computing machine, at least one running application that accesses the subset, wherein the computing machine continues to allow access to the one or more computing resources that are not in the subset, wherein the security policy is enforced with respect to the subset of computing resources and is not enforced with respect to the one or more computing resources that are not in the subset;

determining, subsequent to determining that the active threat exists, that the active threat no longer exists; and allowing, in response to determining that the active threat no longer exists, access to the subset of computing resources.

16. The system of claim 15, wherein the computing machine stores personal computing resources and business computing resources, wherein the subset of computing resources comprises the business computing resources and not the personal computing resources, wherein the computing resources comprise files, email messages, applications, network ports, network destinations, website access permissions, and external filesystem access permissions.

17. The system of claim 15, wherein determining that the active threat exists comprises:

scanning, using the security event detector, the computing machine or the associated network to identify the active threat.

18. The system of claim 15, wherein determining that the active threat no longer exists comprises:

persistently checking using the security event detector, once every threshold time period or upon detection of occurrence of a specified event, whether the active threat still exists at the computing machine or the associated network.

19. The system of claim 15, wherein preventing access to the subset comprises:

making a running application inaccessible at the computing machine, wherein the running application is in the subset or accesses a computing resource from the subset.

20. The system of claim 15, wherein preventing access to the subset comprises:

making one or more files in the subset inaccessible at the computing machine.

* * * * *